UNITED STATES PATENT OFFICE.

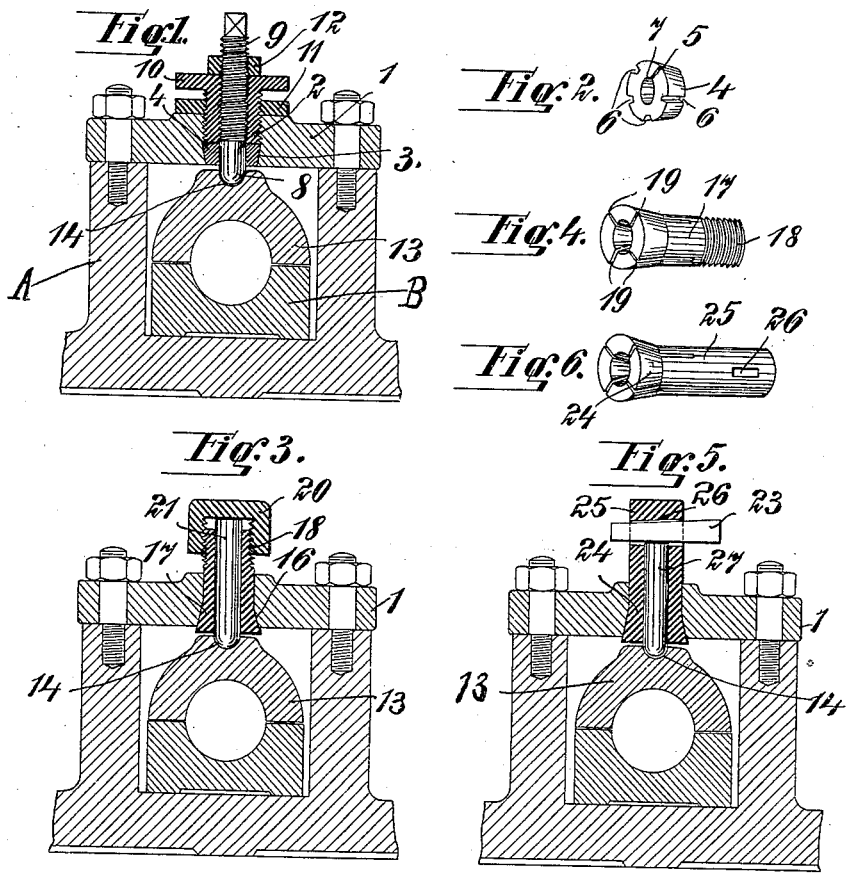
G. KÜPFER.
SHAFT BEARING.
APPLICATION FILED APR. 22, 1908.
943,688.
Patented Dec. 21, 1909.

GUILLERMO KÜPFER, OF SANTIAGO, CHILE.

SHAFT-BEARING.

943,688.   Specification of Letters Patent.   Patented Dec. 21, 1909.

Application filed April 22, 1908. Serial No. 428,494.

*To all whom it may concern:*

Be it known that I, GUILLERMO KÜPFER, a citizen of the Republic of Switzerland, and resident of Santiago, Chile, (whose post-office address is Santiago 2, Republic of Chile,) have invented certain new and useful Improvements in Shaft - Bearings, of which the following is a specification.

This invention relates to self-adjusting shaft bearings, and especially to that class of bearings described and claimed in my Patent No. 888,101, dated May 19, 1908, and my prior application Serial No. 407,655, filed December 23, 1907, in which the bearing sleeve is supported in the bearing body or box by a triangular bearing formed by the apex and base of a triangle, the especial object of the present invention being to provide an improved means of support for the sleeve at the apex of the triangle, adapted especially for heavy loads, or where there is side strain on the bearing sleeve.

In the accompanying drawings forming part of this specification, in which constructions embodying the invention in preferred forms are shown,—Figure 1 is a vertical central section of a bearing embodying the present invention in its preferred form; Fig. 2 is a detail perspective of the locking cone of Fig. 1; Fig. 3 is a view similar to Fig. 1, showing a modified construction; Fig. 4 is a detail perspective of the locking cone of Fig. 3, and Figs. 5 and 6 are views similar to Figs. 3 and 4, showing another modification.

Referring to the drawings, A is the body or box, in which the bearing sleeve B is supported, this bearing sleeve being shown as a split sleeve with its parts connected and positioned relatively to each other as in my prior patent and application above referred to, or in any other suitable manner. The bearing sleeve B is supported in the body A at the apex and base of a triangle, the apex bearing being formed by the hemispherical end 8 of the set-screw 9. The bearing on the base of the triangle is shown as formed by rounded bearing surfaces seated on the smooth inner surface of the body A′, as in Patent No. 888,108, but it will be understood that the form of the bearing on the base side of the triangle may be varied as desired, in connection with the present invention. As shown, the apex bearing is at the top and formed on the top of the bearing body, while the base bearing is at the bottom of the body, but it will be understood that this is not essential to the present invention.

The cap 1 of the body or box is made with a bore, the outer cylindrical portion 2 of which has formed thereon screw threads, while the inner conical portion 3 has a smooth surface. Within the conical portion 3 is a longitudinal split cone 4, having a cylindrical bore which cone is provided with longitudinal grooves 6, so distributed about its circumference as to secure a resilient action while the cylindrical form of the bore is maintained when the cone is uniformly compressed. A bearing screw 9 passes through the bore 7 of the cone 4, and through an internally and externally threaded sleeve 10, which is screwed into the bore 2 of the cap 1, the threads of the screw 9 corresponding with those of the bore 2 and of the sleeve 10. Lock nuts 11, 12 are provided for locking the sleeve 10 and screw 9.

In mounting the parts, the cone 4 is first forced by the sleeve 10 into the conical bore 3, so as to loosely engage the smooth part of the screw 9 and permit the latter to be screwed into the sleeve 10 to secure the desired action of the bearing end 8 on the bearing sleeve, by engagement in the cavity 14 of the upper half 13 of the bearing sleeve, thus securing the latter in place. The sleeve 10 is now screwed down into the cap 1, thus forcing the cone 4 downward in the conical bore 3 and compressing the cone 4 about the smooth part of the screw 9 and thus locking the latter against sidewise strain. The lock nuts 11, 12 are then tightened and the parts thus secured in position. The point bearing at the apex of the triangle is thus locked in the wall of the bearing body against lateral displacement or strain by means of a pressure which is co-axial to that exerted by the point bearing itself, and acting toward the bearing sleeve.

In Figs. 3 and 4 a modified form is shown, in which the pressure for locking the apex bearing piece against lateral displacement operates in the reverse direction from that of the bearing stud. In this construction, the cap 1 is formed with an inwardly flaring bore 16 receiving a divided cone 17 having a cylindrical screw threaded upper stem 18, and splits 19 providing for the compression of the cone about the stud. On the stem 18 of the cone 17 is screwed a cap-screw 20, which acts upon the outer end of the stud 21, the inner hemispherical end of which enters the cavity 14 of bearing sleeve section 13, and forms the apex bearing for the sleeve. By screwing the cap 20 downward, the bolt on the stud 21 is first forced into the cavity 14 and the bearing sleeve adjusted, and the cone 17 is then forced outward and compressed about the stud 21, so as to lock it in position as in the case of screw 9 of Fig. 1. In the construction shown in Fig. 5, the same result is secured by a wedge 23, instead of the screw cap of Fig. 3. The split cone 24 is provided with a smooth cylindrical stem 25, having a slot 26 adapted to receive the wedge. By means of the latter, the stud 27 is first forced into the cavity 14 of the upper half 13 of the bearing sleeve, and then by the further movement of the wedge the cone 24 is pulled outward into the cap 1 and compressed about the stud 27.

The invention provides a very durable and efficient support for the adjustable apex bearing, which will be found especially desirable in connection with shafts carrying heavy loads or where there is special side strain on the shaft, as, for instance, in the case of crank shafts or connecting rods.

It will be understood that the invention is not limited to the closed body or split sleeve illustrated, but that the invention may be applied also in connection with bodies and bearing sleeves of other constructions, as, for instance, with open bodies or with bearing sleeves not split longitudinally. The oiling devices may be formed as shown in Patent No. 888,101, or in any other suitable manner. It will be understood, also, that the invention is not limited to the special form of construction of the locking devices shown, but that modifications may be made while retaining the invention defined by the claims.

What is claimed is:—

1. The combination with a bearing body or box, of a bearing sleeve supported in the body by a triangular bearing, a bearing piece at the apex of the triangle adjustable longitudinally in the body, a conical clamping sleeve adapted to be compressed by movement in the line of adjustment of the latter about the bearing piece, and means for adjusting the clamping sleeve.

2. The combination with a bearing body or box and a bearing sleeve supported therein by a triangular bearing, of a set-screw 9 forming the bearing at the apex of the triangle, a compressible cone 4 inclosing the set-screw in the body, and a sleeve 10 screw threaded in the body and inclosing the set screw 9, for adjusting the cone.

3. The combination with a bearing body or box and a bearing sleeve supported therein by a triangular bearing, of a set-screw 9 forming the bearing at the apex of the triangle, a compressible cone 4 inclosing the set-screw in the body, a sleeve 10 screw threaded in the body and inclosing the set screw 9, for adjusting the cone, and lock nuts for the screw and sleeve.

4. The combination with a bearing body or box and a bearing sleeve supported therein by a triangular bearing, of a set-screw 9 forming the bearing at the apex of the triangle, a compressible cone 4 inclosing the set-screw in the body, a sleeve 10 screw threaded in the body and inclosing the screw 9 and screw threaded to co-act with screw 9, and lock nuts for the screw and sleeve.

In testimony whereof, I have hereunto set my hand in the presence of two subscribing witnesses.

GUILLERMO KÜPFER.

Witnesses:
 WOLDEMAR HAUPT,
 HENRY HASPER.